April 16, 1968 D. J. FLAVIN 3,377,866
PRESSURE MEASURING INSTRUMENT
Filed Jan. 17, 1966 4 Sheets-Sheet 1
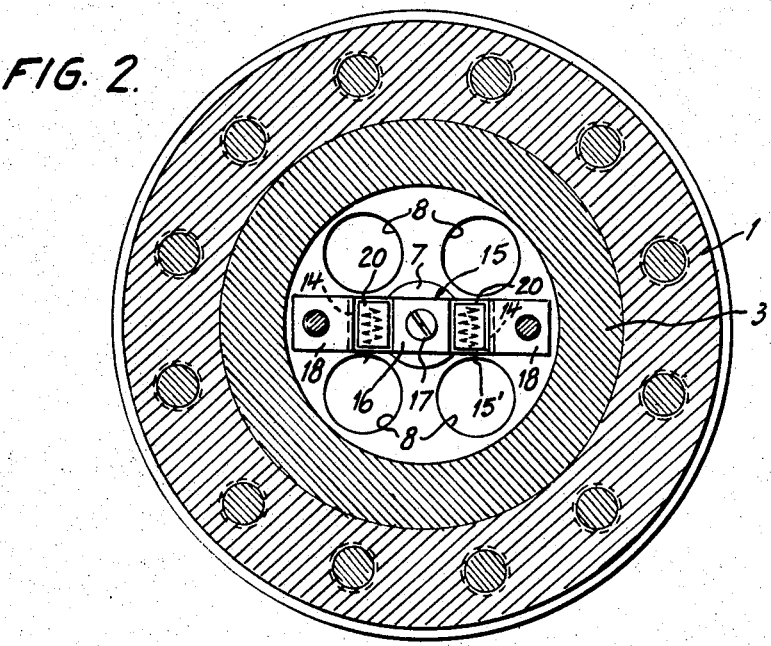
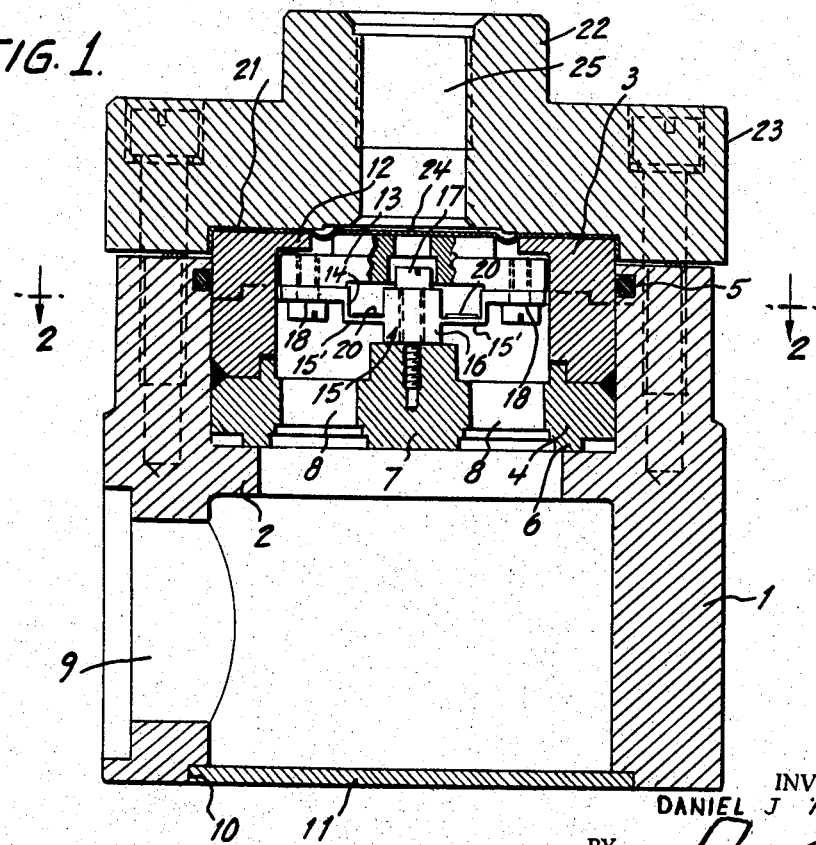
INVENTOR.
DANIEL J FLAVIN
BY
ATTORNEY

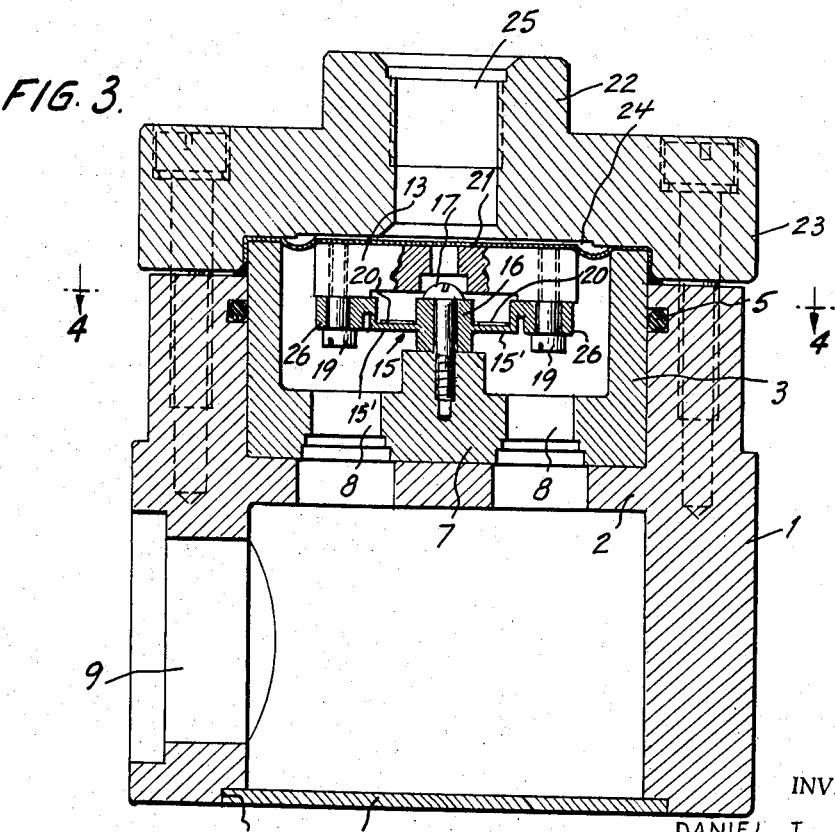

April 16, 1968

D. J. FLAVIN 3,377,866

PRESSURE MEASURING INSTRUMENT

Filed Jan. 17, 1966

INVENTOR.
DANIEL J FLAVIN
BY
ATTORNEY

INVENTOR.
DANIEL J. FLAVIN
ATTORNEY

United States Patent Office 3,377,866
Patented Apr. 16, 1968

3,377,866
PRESSURE MEASURING INSTRUMENT
Daniel J. Flavin, Tonawanda, N.Y., assignor to Taber Instrument Corporation, North Tonawanda, N.Y., a corporation of New York
Filed Jan. 17, 1966, Ser. No. 523,006
2 Claims. (Cl. 73—398)

ABSTRACT OF THE DISCLOSURE

The pressure measuring instrument provided by the present invention has a cylindrical outer casing formed with an inner annular flange supporting a pair of cylindrical inner casing members providing an inner end wall mounting a force responsive member having radially extending arms carrying strain gauges electrically connected to registering apparatus for registering force variations applied to the strain gauges by an operating disc connected to the arms and housed within the outer casing for applying variations in fluid pressure in a conduit connected to a cover on the end of the casing.

---

The present invention relates to improvements in pressurizing measuring instruments particularly a construction forming an improvement over the constructions shown in the patent application of Ralph F. Taber, Ser. No. 224,359, filed Sept. 28, 1962, now Patent No. 3,204,463; and the patents to Dumas 3,045,490, July 24, 1962; Dumas 3,057,202, Oct. 9, 1962; Taber, 3,024,649, Mar. 13, 1962; British patent to Gwtakin, 698,793, Oct. 21, 1953; and Dimeff et al., 3,022,672, Feb. 27, 1962.

The present invention provides a pressure measuring transducer or instrument constructed in such a way that it is not affected by external pressure or variations in temperature adjacent the casing members.

The invention provides a pressure measuring instrument having a cylindrical outer casing formed with an inner annular flange supporting a pair of inner cylindrical casing members mounted in end to end engaged relation in which one of the inner cylindrical casing members is formed to provide an inner end wall while a force transmitting plate is slidable in the other end of the other inner casing member and has opposite ends of a force responsive member formed by a transversely extending bar secured to opposite marginal portions thereof with the central portion of said bar secured to the central portion of the inner end wall to isolate said force responsive member from the effects of heat and pressure on the outer surface of the casing and provides an instrument that is economical to manufacture so it will provide accurate results in operation in measuring variations in fluid pressure.

The invention provides a force responsive member extending transversely in substantially diametrical relation with the center portion secured to the casing and opposite end portions secured to a force transmitting member slidable longitudinally in the casing in order to provide a substantially sensitive instrument which will accurately measure variations in fluid pressure and which is relatively inexpensive to manufacture and assemble. The force responsive member may be made of a sheet metal strip in which opposite ends of the strip form arms responsive to variations in force to operate sensing elements fastened to one or both sides of the arms sensitive to variations in force for operating conventional registering apparatus. With the force responsive member made of a sheet metal strip, the center portion will be rigidly attached to one part of the casing construction while the ends will be rigidly attached to a force transmitting member slidable in the casing.

The invention provides a force responsive member having a substantially square or rectangular supporting block provided with arms extending radially outward and having attaching blocks mounted on the free ends thereof for attachment to the margins of a force transmitting member or disc while the supporting block is rigidly mounted on a wall section extending transversely in the casing for the instrument. The arms may be made of sheet metal of a desired character to enable the manufacture of a more sensitive instrument in an economical manner in which sensing elements mounted on the arms will operate more efficiently in measuring variations in fluid pressure.

In the drawings:

FIG. 1 is a vertical transverse cross section through a force operated instrument constructed according to the invention.

FIG. 2 is a cross section taken substantially along the line 2—2 of FIG. 1.

FIG. 3 is a vertical transverse cross section through a slightly modified force operated instrument constructed according to the invention.

FIG. 4 is a cross section taken substantially along the line 4—4 of FIG. 3.

FIG. 5 shows one of the force responsive bars used in the instrument in perspective.

Figure 6:
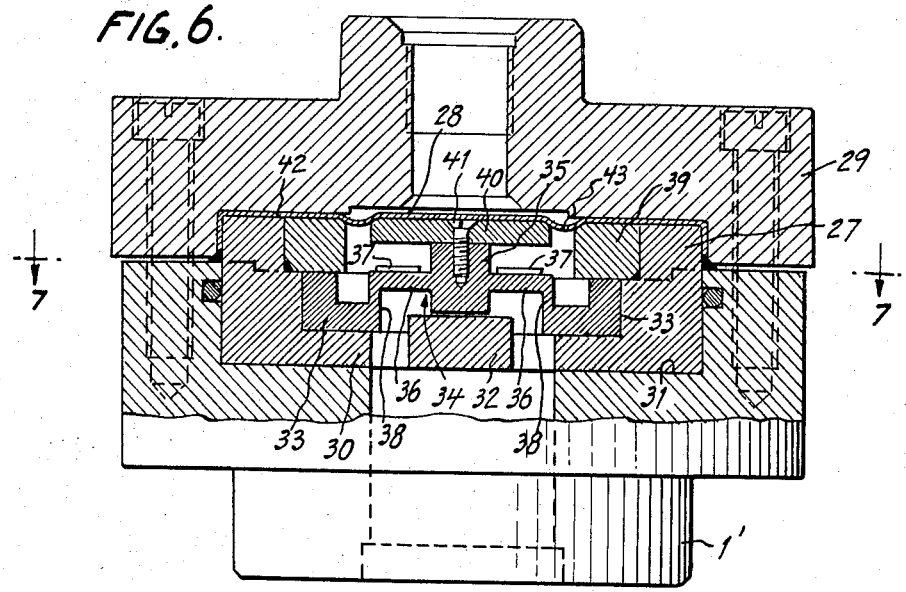
FIG. 6 shows a vertical transverse cross section through a modified form of instrument construction.

According to the invention, a casing 1 of generally cylindrical form open at both ends has an inwardly and transversely extending radial flange 2 forming a seat for a cylindrical housing carrying the operative parts of the instrument. This flange extends only partially across the inside of casing 1. This cylindrical housing has cylindrical housing members 3 and 4 of substantially uniform size engaged and secured together in end to end relation with the end of member 4 engaged with flange 2. The housing members 3 and 4 slidably engage in one end of casing 1 and are rigidly attached to casing 1 by welding or the like to hermetically seal the housing members in casing 1 in rigid assembled relation on flange 2. The housing members 3 and 4 are welded and hermetically sealed together prior to assembly in housing 1. Any welding material that projects beyond the outer surfaces of the assembled housing members 3 and 4 is removed by suitable metal turning, grinding or other conventional metal finishing operations to provide a cylindrical outer surface that will freely slide into casing 1 for assembly therein. An O-ring 5 or other sealing element is inserted in a sealing ring groove formed in casing 1 near the outer end so as to provide an effective seal about the assembled housing members.

The housing member 4 is made from a metal disc formed to provide a seat engaging flange 6 for engaging flange 2 and positioning housing member 3 and 4 in a desired assembled position in casing 1. The disc forming housing member 4 is formed with a central supporting block 7, while apertures 8 are formed therein to provide passages between the interior of the housing members and casing 1 for passage of wiring connections. The wiring connections, not shown, are also adapted to extend through an opening 9 formed in one side of casing 1 which may have suitable casing members secured to casing 1 so that electrical connections may be made with the recording or registering apparatus at a location remote from casing 1 and hemetically sealed in the housing. The lower end of casing 1 is formed with a seat 10 to receive a closure plate 11 welded in place to hermetically seal the lower end of casing 1 as shown, see FIGS. 1 and 3.

Casing member 3 is formed with an inwardly extending radial flange 12 for limiting outward movement of piston or force transmitting member 13. Force transmitting member 13 is in the form of a metal disc having the outer marginal portion recessed to receive radial flange 12.

A force responsive member 15 is made of a metal bar formed with a substantially rectangular attaching block 16 in the center of the bar with the bar having arms 15′ extending radially outward from opposite sides of block 16. An attaching screw 17 extends through an opening in attaching block 16 and is threaded in central supporting block 7 for rigidly attaching the bar and block 16 to block 7 of casing member 4. Attaching blocks 18 are formed on the outer ends of arms 15′ at the outer ends thereof and have attaching screws 19 rigidly and detachably securing attaching blocks 18 to the flat inner face of force transmitting member or piston 13 at opposite marginal inner side portions thereof.

The attaching block 16 is substantially rectangular in cross section both diametrically and transversely and is substantially rectangular in both plan view and side elevation. The bar 15 is formed to provide arms 15′ extending radially and diametrically across housing member 3 between attaching blocks 18 and opposite marginal portions of piston 13. The bar 15 is of uniform width between opposite ends and has the arms 15′ reduced in thickness so they are relatively flexible when the outer ends are moved longitudinally in the casing in movement of force transmitting member 13.

Strain gauges 20 of conventional form are applied to the flat upper and/or lower surfaces of arms 15′. Strain gauges 20 may be the usual resistance type or other form of available strain gauge suitable for the purpose. These gauges are electrically connected to suitable conventional electrically operated registering apparatus for registering variable pressures applied to the gauges through flexing of arms 15′ while gauges 20 combined form a sensing means for the instrument.

The instrument is constructed for operation to measure variations in force or pressure in fluids.

When the instrument is assembled, casing member 3 has one end projecting beyond the end surface of casing 1 where it forms a support and seat for a flexible diaphragm 21. The diaphragm 21 is applied over the end of housing member 3 so that the central portion has the bottom surface engaged with the outer surface of piston 13 and the marginal portion engaged with the end surface of housing member 3 so the outer edge may be folded or formed around the outer surface of housing member 3 to which it is sealed by solder or other sealing material.

An end cap 22 is applied on the end of casing 1. End cap 22 has a cylindrical flange 23 which fits over the projecting end of casing member 3 with the surface of the cap within the flange engaged with the outer surface of the diaphragm 21 for sealing the diaphragm on the casing member when the cap is bolted to casing 1. The end cap 22 is formed with a recess 24 in the central portion of the inner end and has a threaded passage 25 through the cap for attachment of a pipe connection in applying fluid pressure to the diaphragm for measurement of variations in fluid pressure by the sensing means by operation of gauges 20.

The periphery of transmitting member or piston 13 is cylindrical and spaced a small distance from the inner cylindrical surface of housing member 3. The diaphragm 21 is formed with a flexible bead portion about the piston 13 which projects into the space between piston 13 and the housing member 3.

The transducer constructed as shown in FIGS. 1, 2, 3, 4, and 5 is suitably connected to a source of fluid pressure to be measured. The fluid pressure will move the force transmitting member or piston 13 toward the opposite end of housing member 3 and flex radial arms 15′ for flexing gauges 20 which will operate the sensing means to register or record the fluid pressure and also variations in pressure since the instrument is constructed to be highly sensitive to variations in pressure.

In making the force responsive member or bar 15, the arms 15′ are constructed to have the attaching blocks 18 offset relative to the ends of radial arms 15′ by forming the bar with end sections 14 extending at right angles to the adjacent end portions of arms 15′ and blocks 18 for connecting the inner ends of blocks 18 to the outer ends of arms 15′. It will be understood that the arms 15′ may be made of suitable sheet metal or the like for obtaining the desired flexibility of the arms for operating the strain gauges 20 carried thereby in a desired manner.

The construction shown in FIGS. 3 and 4 is identical with that shown in FIGS. 1 and 2, with a slight modification of one of the parts that will now be described.

The invention contemplates the construction of the force responsive member 15 from a solid metal plate machined to form a supporting ring 26, FIG. 3, of circular shape with flat top and bottom faces so that one face will engage and seat on the flat inner face formed on the margin of force transmitting member or piston 13. The bolts 19 may be used to detachably secure ring 26 to piston 13. The central portion of the metal plate is machined to form the diametrically extending bar 15 with the central block 16, arms 15′ and the other details of construction hereinbefore described so that the force responsive member is otherwise substantially identical to that hereinbefore described. It will be understood that bar 15 may be made of sheet metal with opposite ends attached to ring 26 at diametrically opposite positions in any suitable or desired manner, such as by welding, riveting or the like. Similar numerals are used on corresponding parts in all figures.

The central portion of the force transmitting member or piston 13 is formed with a recess or the like, as shown in the drawings FIG. 1 and 3, to accommodate the head of screw 17. The supporting block 16 is constructed so that when the instrument is assembled the outer end face on block 16 will lie in a position just a few thousandths, about five thousandths of an inch, from the adjacent inner surface of force transmitting member 13 to form a stop for limiting movement of member 13 to prevent injury or damage to the force transmitting member 15 from the application of excessive pressure to the assembled instrument.

Figure 7:
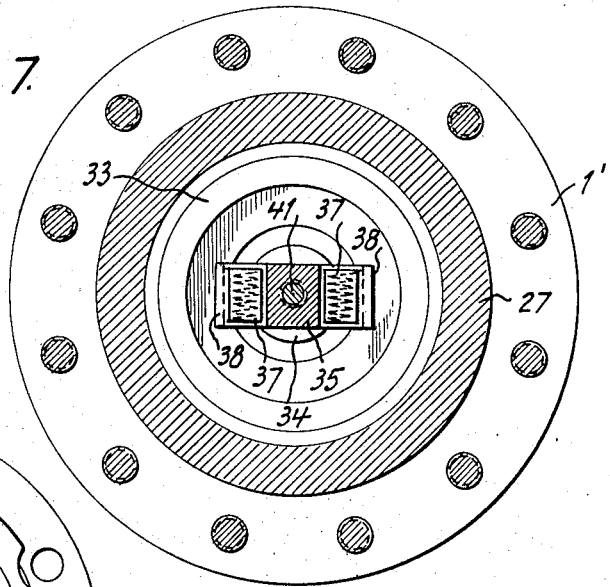
FIG. 7 is a horizontal cross section taken substantially along the line 7—7 of FIG. 6.
Figure 8:
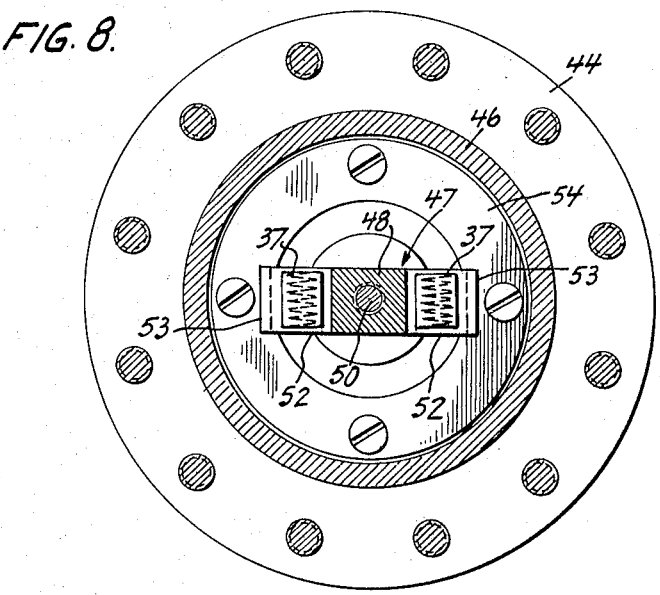
FIG. 8 is a horizontal cross section of a modified force responsive member shown in FIGS. 6 and 7 taken substantially along line 8—8 of FIG. 9.

The modified construction shown in FIGS. 6 to 8 has a casing 1′ which is a substantial duplicate of casing 1. A cylindrical housing member 27 is slidably mounted in a recess formed in the upper end of casing 1′ as shown in FIG. 6 which has the upper end projecting outwardly from the recess into a recess 28 formed in the inner end of a cap 29 detachably mounted by suitable bolts on the upper end of casing 1′.

The cylindrical housing member 27 is made of a metal disc formed so the outer radial marginal surface of wall 30 will seat on shoulder 31 formed in casing 1′ to fix the position thereof lengthwise of the casing. Wall 30 has a central block 32 forming a stop for limiting movement of the piston and stress responsive arms to prevent damage to the instrument as hereinafter described. The block 32 has a flat surface facing the outer end of the casing.

A force responsive member 34 is made of a metal disc formed to provide a circular supporting ring 33 machined to form a diametrically extending force responsive bar 36 having a substantially rectangular attaching block 35 in the center of bar 36 and carrying force responsive strain gauges 37 having wire connections to conventional registering, recording or control apparatus which is not shown. Strain gauges like gauges 37 may be mounted on both the upper and lower sides of arms 36 if desired. The arms 36 are formed with flat top and bottom surfaces which are substantially parallel to each other. The bar 34 has the outer ends formed with angular end sections 38 connecting the bar 34 to the supporting ring 33 in which one end of each section 38 extends at right angles to the ends of arms 36. The other ends of sections 38 are integrally joined with supporting ring 33 and extend in diametrical relation to each other partially across the ring.

A retaining ring 39 is mounted in an annular recess in the outer end of housing member 27 for retaining force responsive member 34 in housing member 27. The retaining ring 39 is rigidly retained in the housing member 27 by suitable welding at the joint between the members. An annular plate 40 forms a piston for the instrument. Plate 40 has a size slightly smaller than the opening in retaining ring 39. A flat head screw 41 detachably mounts the plate 40 on the outer end of attaching block 35 and forms a force transmitting member. A flexible diaphragm 42 has the inner surface of the central portion seated on the outer surface of the plate 40, a loop portion 43 extending inwardly around the periphery of the plate 40 between the plate and the inner edge of retaining ring 39 to provide for relative movement of the piston to the retaining ring in operation of the instrument. The outer marginal portion of diaphragm 42 is extended over the outer end surfaces of retaining ring 39 and housing member 27, to which it is sealed by solder or the like to hermetically seal the diaphragm on the housing. The cap 29 seals the diaphragm on the housing and prevents leakage between the cap and the diaphragm. The inner end of block 35 has the end surface spaced only a slight distance, two to five thousandths of an inch, from central block 32 to limit longitudinal movement of the piston and block 35 to prevent damage to the instrument from excessive pressure.

The supporting ring 33 is not permanently secured to the casing 27 but is slidable therein. If desired, ring 33 may be secured to casing 27 by bolts or other equivalent means.

Figure 9:
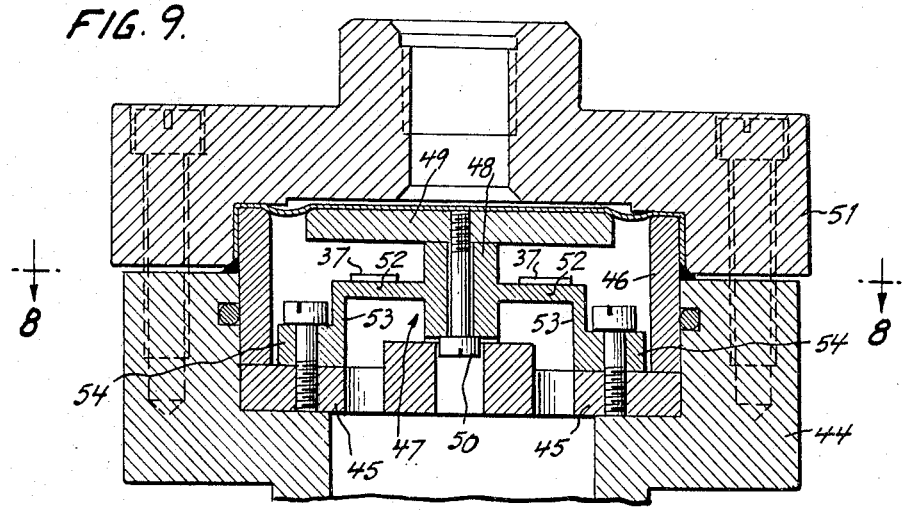
FIG. 9 is a vertical cross section of another modified form of the instrument shown in FIG. 8 taken substantially on line 9—9 of FIG. 8.

The modified construction shown in FIGS. 8 and 9 has a casing 44 detachably receiving supporting plate 45 in a cylindrical recess therein which may be loosely engaged in the recess or rigidly secured to the casing. A cylindrical member 64 is attached at one end to the outer marginal portion of supporting plate 45 to house the force responsive member 47 formed of a central rectangular block 48 having a flat upper end surface supporting the circular piston plate 49 secured to block 48 by a screw 50 threaded in an opening in plate 49, extending through a bore in block 48. Supporting plate 45 is formed in the central portion with an aperture large enough to receive the head of screw 50 and conceal it. The instrument shown in FIG. 9 has a cap 51 bolted to casing 44 to retain the force responsive member in the casing. The cap 51 has a threaded passage formed therein like the cap 29 to receive a threaded pipe connection so fluid pressure may be applied to the instrument for measurement of the fluid pressure in the pipe and variations thereof.

The force responsive member 47 is machined from a metal plate or the like to provide the central supporting block 48, force responsive arms 52 extending radially from supporting block 48 and having angularly extending end portions 53 connecting the ends of arms 52 to supporting blocks 54 which may also be in the form of a ring like that shown in FIG. 6. Strain gauges like gauges 37 are applied to the flat faces of arms 52 and connected in electrical circuits with the registering or recording apparatus for measuring the fluid pressure and variations thereof applied to the piston. The supporting blocks 54 may be secured to the casing or left separate as desired.

Figure 10:
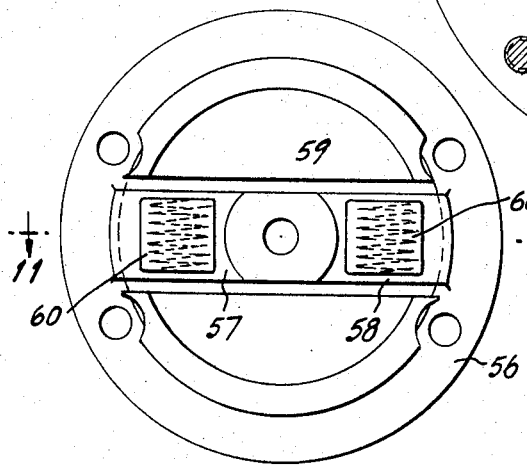
FIG. 10 is a plan view of a modified form of force responsive member.
Figure 11:
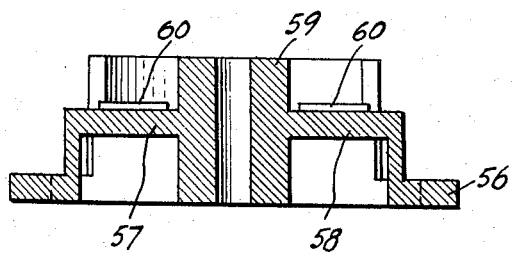
FIG. 11 is a vertical transverse cross section of the force responsive member shown in FIG. 10 taken substantially along the line 11—11 of FIG. 10.

A modified form of force responsive member is shown in FIGS. 10 and 11 having a supporting ring 56 machined on a lathe or the like to support a radially and diametrically extending force responsive bar or arms 57 and 58 having the supporting block 59 formed in the center of arms 57 and 58 to which the arms are attached and from which they extend radially and diametrically to ring 56. Ring 56 is formed with apertures at predetermined positions to receive bolts for attaching the ring to the casing or a flange formed therein so the force responsive member may be rigidly secured thereto where desired. The arms 57 and 58 are formed of uniform construction to receive conventional strain gauges indicated at 60. The supporting block 59 is formed in the center of arms 57 and 58 to mount the piston plate to operate the force responsive member in the same manner described and shown in the other forms of the invention hereinbefore described and illustrated. The strain gauges 60 may be duplicates of those used on the other force responsive members described and shown.

The force responsive member shown in FIGS. 10 and 11 in being capable of formation on a lathe with the elimination of many special machining operations can be made at a relatively low cost and enables the instrument herein shown and described to be produced at a relatively low cost.

The force responsive members shown in the several figures of the drawing and hereinabove described may be made from a single bar for detachable mounting in the casing or for loose assembly in the casing without being rigidly attached thereto. The cost of manufacture may be kept at a minimum by manufacture of the members on a lathe with a minimum of milling operations.

The invention provides an instrument construction in which the casing may be readily and economically machined or fabricated from tubular members cut off to a desired length and machined to form the configurations illustrated by the drawings. The pair of cylindrical casing members 3 and 4 may be made from specially formed pieces of metal that may be readily and economically machined into the form shown by the drawings for assembly of the piston and force responsive member into a hermetically sealed unit in the casing. The force responsive member may be readily made from bar stock or an annular piece of metal plate to form the radial arms with the attaching blocks or the supporting ring by conventional machining operations which may be made at an economical cost whereby the cost of making the instrument may be kept within a reasonable amount. The stress responsive member may be made so that a semi-conductor type of gauge element may be used on each of the arms 15'.

The instrument constructed as above described and illustrated in the drawings, FIGS. 1 to 5, provides a construction in which the casing members 1, 3 and 4 operate to insulate the instrument so heat is not readily transmitted to the strain gauges 20 and does not readily affect operation of the instrument. The casing members also operate so pressure on the outside of the cylindrical casing members is not readily transmitted to the force responsive arms 15' and therefore, does not readily affect the operation of the instrument in recording variations in fluid pressure or cause the instrument to register incorrectly.

The instrument disclosed in the drawings and hereinbefore described is useful where where most other transducers now known in the art are used and provides a construction that may be made at a lower cost for more efficient operation.

The invention claimed is:

1. A force measuring instrument comprising an outer cylindrical casing formed with an inwardly extending annular flange in an intermediate position between opposite ends to form a seat, a pressure sensitive device having a pair of cylidrical casing members hermetically secured together in interengaged end to end relation with the end of one of said members engaged on said seat formed by said inwardly extending flange, a force responsive member mounted in one of said casing members, said one of said casing members being formed with a supporting block in the central portion, said force responsive member being formed of a flexible sheet metal bar having a substantially rectangular supporting block formed in the center of said bar engaged on said supporting block, means detachably securing said supporting block of said bar to said supporting block in said one of said casing members the other of said casing members being formed with an inwardly extending annular flange on the free end thereof, a force transmitting member formed of a sheet metal disc of circular form having substantially parallel opposite faces slidably engaged in said other of said casing members inwardly of said flange, said sheet metal bar being formed with terminal blocks on the free ends, means detachably securing said terminal blocks to opposite marginal portions of said sheet metal disc, and sensing means mounted on said radially extending portions of said bar for measuring variations in force transmitted thereto by said force transmitting member.

2. In a force measuring instrument as claimed in claim 1, wherein said force responsive member has said supporting block of substantially rectangular form in cross section both transversely and diametrically of said instrument, said force responsive member having arms extending radially outward in aligned relation from opposite sides of said supporting block of substantially uniform cross section and equal width to said block, and of equal length, said radial arms having the free ends offset longitudinally relative to said casing from the inner ends thereof, said terminal blocks on the free ends of said arms having a substantially rectangular shape in cross section both radially and transversely, said free ends and terminal blocks being connected to said radial arms by arm sections having a cross section substantially the same as said radial arms, and means mounting said sensing means on said radial arms.

References Cited
UNITED STATES PATENTS

| | | | |
|---|---|---|---|
| 3,022,672 | 2/1962 | Dimeff et al. | 73—398 |
| 3,204,463 | 9/1965 | Taber | 73—398 |
| 3,303,451 | 2/1967 | Yuan | 338—4 |
| 3,303,452 | 2/1967 | Booth | 73—141 XR |

DAVID SCHONBERG, *Primary Examiner.*

D. O. WOODIEL, *Assistant Examiner.*